United States Patent Office 2,826,574
Patented Mar. 11, 1958

2,826,574

NEW DISAZO-DYESTUFFS

Rudolf von Capeller, Riehen, Switzerland, assignor to Ciba Limited, Basel, Switzerland No Drawing. Application October 11, 1954
Serial No. 461,680

Claims priority, application Switzerland October 26, 1953

8 Claims. (Cl. 260—175)

This invention provides new disazo-dyestuffs which, like, for example, the dyestuff of the formula (1)
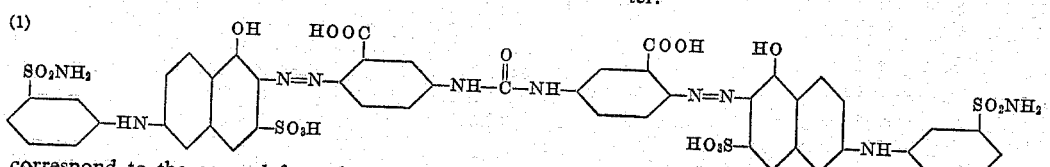

correspond to the general formula (2)
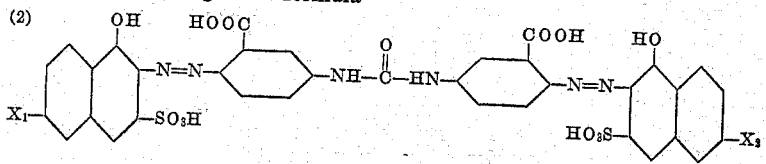

in which $X_1$ and $X_2$ each represent a phenylamino group, and at least one of the phenyl radicals of the groups $X_1$ and $X_2$ is substituted by a group imparting solubility in water.

The invention also includes a process for making the new dyestuffs of the above Formula 2 wherein an amino-mono-azo-dyestuff of the formula (3)
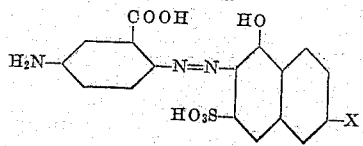

in which X represents a phenylamino group substituted in the phenyl radical by a group imparting solubility in water, is reacted with phosgene.

The starting materials of the Formula 3 can be made by coupling a diazotized 1-aminobenzene-2-carboxylic acid, which contains in the 4-position a substituent convertible into an amino group, for example, a nitro or acetylamino group, with a 2-phenylamino-5-hydroxynaphthalene-7-sulfonic acid, which contains in the phenyl radical a group imparting solubility in water, and subsequently converting the aforesaid substituents into amino groups. As groups imparting solubility in water, there come into consideration, for example, a sulfonic acid amide group, a carboxymethoxy group, a carboxylic acid group or a sulfonic acid group.

The 2-phenylamino-5-hydroxynaphthalene-7-sulfonic acids used as coupling components, which contain in the phenyl radical a sulfonic acid amide group, can be made by methods in themselves known from 2-amino-5-hydroxynaphthalene-7-sulfonic acid or 2:5-dihydroxynaphthalene-7-sulfonic acid and an aminobenzene sulfonic acid amide by reaction with a sulfite (the so-called Bucherer reaction).

The 4-acetylamino- or 4-nitro-1-aminobenzene-2-carboxylic acid is coupled in an alkaline medium, advantageously a weakly alkaline medium, with the 2-phenylamino-5-hydroxynaphthalene-7-sulfonic acid substituted in the manner described above. The acetylamino group can then be hydrolyzed or the nitro group reduced in known manner.

The reaction of the resulting amino-monoazo-dyestuffs of the Formula 3 with phosgene is advantageously carried out in such manner that two molecules of such a dyestuff are linked together to form a symmetrical urea derivative. Alternatively, two different amino-azo-dyestuffs, obtainable by coupling the aforesaid diazo-compounds with 2-phenylamino-5-hydroxynaphthalene-7-sulfonic acids followed by conversion into amino groups of the substituents so convertible, are together reacted, advantageously in equimolecular proportions, with phosgene, at least one of the dyestuffs containing in the aminophenyl radical a group imparting solubility in water.

The reaction with phosgene is advantageously conducted in an aqueous weakly alkaline medium.

The new disazo-dyestuffs of the Formula 2 can also be obtained by coupling on both sides tetrazotized 4:4'-diaminodiphenyl-urea-3:3'-dicarboxylic acid with 2-phenylamino-5-hydroxynaphthalene-7-sulfonic acids, the coupling being carried out at least on one side with a 2-phenylamino-5-hydroxynaphthalene-7-sulfonic acid substituted in the phenyl radical by a group imparting solubility in water. As coupling components there come into consideration advantageously 2-phenylamino-5-hydroxynaphthalene-7-sulfonic acids which are substituted in the phenyl radical by the groups imparting solubility in water mentioned above. As a rule it is of advantage to couple the tetrazotized 4:4'-diamino-diphenyl-urea-3:3'-dicarboxylic acid on both sides with coupling components of this kind, for example, one molecular proportion of the tetrazo compound is coupled with 2 molecular proportions of such a coupling component.

The coupling of the tetrazo-compounds with coupling components of the kind mentioned above is also carried out in an alkaline medium.

The new dyestuffs of the Formula 2 are distinguished by their good solubility in water, and are suitable for dyeing or printing a very wide variety of materials, especially cellulose-containing materials such as cotton, linen, and artificial silk or staple fibers of regenerated cellulose, and they produce level dyeings. Especially valuable are dyeings and prints which have been treated with an agent yielding metal, especially an agent yielding copper. This treatment may be carried out on the fiber, in the dyebath or partially on the fiber and partially in the dyebath as described, for example in U. S. Patent No. 2,148,659.

Valuable dyeings can also be produced by the process in which a dyeing produced with the metal-free dyestuff is after-treated with an aqueous solution which contains on the one hand, a basic formaldehyde condensation product of a compound which contains at least once the atomic grouping

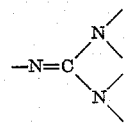

or which can easily be converted into such a compound, for example, cyanamide, and, on the other, a water-soluble copper compound, especially a complex copper compound.

The new dyestuffs of the Formula 2, as compared with the corresponding dyestuffs containing no groups imparting solubility in the phenyl radicals, are distinguished by a better solubility in water and a better levelling capacity, and unexpectedly yield coppered dyeings having practically equally good properties of wet fastness. These dyeings are also very pure in tint and possess a very good fastness to light.

The following examples illustrate the invention, the parts and percentages being by weight:

Example 1

18.2 parts of 4-nitro-1-aminobenzene-2-carboxylic acid are stirred well with 170 parts of water and 22 parts of sodium hydroxide solution of 30 percent strength. The mixture is then diluted with 380 parts of water and a further 12 parts of sodium hydroxide solution of 30 percent strength are added. The whole is heated to 60° C., and the 4-nitro-1-aminobenzene-2-carboxylic acid is precipitated by the addition of 37 parts of hydrochloric acid of 30 percent strength. At a temperature of 45° C. there is added rather rapidly a solution of 7 parts of sodium nitrite in 30 parts of water. After about ½ hour the diazotization is complete. The diazo-solution is neutralized with sodium bicarbonate until its reaction is only just weakly acid to Congo.

41.4 parts of 2-phenylamino-5-hydroxynaphthalene-7-sulfonic acid-3'-sulfonic acid amide are dissolved in 700 parts of water and 8 parts of sodium carbonate. The solution is rendered weakly acid to litmus with hydrochloric acid. 18 parts of sodium bicarbonate are then added, and the diazo-solution described above is run in at a temperature of 35° C. in the course of about 1 hour. The whole is stirred overnight at room temperature and at a pH value of 7 to 8.5. When the coupling is finished, the mixture is heated to 85° C., 28 parts of sodium carbonate and 45 parts of sodium hydroxide solution of 30 percent strength are added, and the resulting monoazo-dyestuff is salted out with 150 parts of sodium chloride and filtered off while hot.

In order to reduce the nitro group the press cake of the monoazo-dyestuff is stirred well at 50° C. in 800 parts of water, and 8.2 parts of sodium hydrosulfide dissolved in 50 parts of water are run in at that temperature in the course of ½ hour. The reduced dyestuff passes into solution. By introducing phosgene at 40–45° C. the urea derivative of this amino-monoazo-dyestuff is obtained. By the addition of sodium carbonate the solution is maintained continuously alkaline to Brilliant Yellow-paper. The disazo-dyestuff precipitates, and is filtered off with suction and dried in vacuo.

The same dyestuff can also be obtained by tetrazotizing 4:4'-diamino-diphenyl-urea-3:3'-dicarboxylic acid indirectly in the usual manner, and coupling the tetrazo-compound on both sides with 2-phenylamino-5-hydroxynaphthalene-7-sulfonic acid-3'-sulfonic acid amide in a medium rendered alkaline with bicarbonate, and filtering off the resulting disazo-dyestuff with suction and drying it in vacuo.

By the single bath or 2-bath after-coppering process the disazo-dyestuff so obtained dyes cotton and viscose red-violet tints of good fastness to light and good properties of wet fastness.

The 2-phenylamino-5-hydroxynaphthalene-7-sulfonic acid-3'-sulfonic acid amide can be prepared as follows:

A mixture of 240 parts of 2-amino-5-hydroxynaphthalene-7-sulfonic acid, 200 parts of 1-aminobenzene-3-sulfonic acid amide, 800 parts of a solution of sodium bisulfite of 40 percent strength and 100 parts of sodium hydroxide solution of 30 percent strength is boiled for 15 hours under reflux. Upon cooling the mixture to about 0–10° C. the reaction product crystallizes out. The latter is filtered off and washed with a saturated solution of sodium chloride. It is a grey-white substance, which dissolves easily in water. If desired it may be dried.

Instead of 2-amino-5-hydroxynaphthalene-7-sulfonic acid, 2:5-dihydroxynaphthalene sulfonic acid may be used for the reaction with 1-aminobenzene-3-sulfonic acid amide.

Example 2

19.4 parts of 1-amino-4-acetylaminobenzene-2-carboxylic acid are stirred well with 300 parts of water. 30 parts of hydrochloric acid of 30 percent strength are then added, and a solution of 7 parts of sodium nitrite in 30 parts of water are introduced dropwise at 10–15° C. in the course of ½ hour. In order to complete the diazotization the mixture is stirred for a further 2 hours at room temperature.

39 parts of 2-(4'-carboxymethoxyphenylamino)-5-hydroxynaphthalene-7-sulfonic acid are dissolved in 400 parts of water with 30 parts of anhydrous sodium carbonate, and the diazo-suspension described above is run in at a temperature of 10–15° C. The whole is stirred overnight at room temperature. When the coupling is finished the resulting monoazo-dyestuff is salted out with 100 parts of sodium chloride and filtered off with suction.

In order to hydrolyze the acetyl group the press cake of this monoazo-dyestuff is stirred with 800 parts of water, then 120 parts of sodium hydroxide solution of 30 percent strength are added, and the whole is heated for 3 hours at 80–90° C. It is then allowed to cool to 40–50° C. and neutralized with hydrochloric acid until the solution is just alkaline to Brilliant Yellow paper only. The urea derivative of this amino-monazo-dyestuff is obtained by introducing phosgene at 40–50° C. By the addition of sodium carbonate the solution is maintained constantly alkaline to Brilliant Yellow paper. The resulting diazo-dyestuff is salted out with 80 parts of sodium chloride, filtered off with suction and dried in vacuo. By the single bath or 2-bath after-coppering process this disazo-dyestuff dyes cotton and viscose blue-violet tints.

33 parts of 4:4'-diaminodiphenyl-urea-3:3'-dicarboxylic acid are dissolved in 400 parts of water and sufficient sodium hydroxide to render the solution weakly alkaline. There is then added a solution of 14 parts of sodium nitrite in 60 parts of water, the mixture is cooled with ice to 0–5° C., and 60 parts of hydrochloric acid of 30 percent strength are added. The whole is stirred at 10–20° C., and after about 1 hour the diazotization is complete.

31.5 parts of 2-phenylamino-5-hydroxynaphthalene-7-sulfonic acid and 39 parts of 2-(4'-carboxymethoxyphenylamino)-5-hydroxynaphthalene-7-sulfonic acid are dissolved in 600 parts of water with 70 parts of anhydrous sodium carbonate, and the solution is cooled with ice to 10° C. This solution is poured into the tetrazo-suspension referred to above, and coupling is allowed to take place at room temperature, overnight.

The mixture is then heated to 50° C., 150 parts of sodium chloride are added, and the precipitated asymmetrical urea-compound is filtered off. This disazo-dyestuff is dried in vacuo.

By the single bath or 2-bath after-coppering process the disazo-dyestuff so obtained dyes cotton and viscose violet tints of good fastness to light and having good properties of wet fastness.

Example 4

19.4 parts of 1-amino-4-acetylaminobenzene-2-carboxylic acid are diazotized in the usual manner.

40 parts of 2-(4′-aminophenylamino)-5-hydroxynaphthalene-7:3′-disulfonic acid are dissolved in 300 parts of water and 30 parts of anhydrous sodium carbonate. At a temperature of 10–15° C. the above diazo-suspension is run in. The whole is stirred overnight at room temperature. When the coupling is finished, the resulting monoazo-dyestuff is salted out with 150 parts of sodium chloride and filtered off with suction.

In order to hydrolyze the acetyl group the press cake of this monoazo-dyestuff is stirred with 800 parts of water, 120 parts of sodium hydroxide solution of 30 percent strength are added, and the whole is heated for 3 hours at 80–90° C.

The mixture is allowed to cool to 40–50° C., and is neutralized with hydrochloric acid until the solution is alkaline to Brilliant Yellow paper only. The urea-compound of this amino-monoazo-dyestuff is obtained by introducing phosgene at 40–50° C. The solution is maintained continuously alkaline to Brilliant Yellow paper by the addition of sodium carbonate. The diazo-dyestuff so obtained is salted out with 120 parts of sodium chloride, filtered off with suction and dried in vacuo.

By the single bath or 2-bath after-coppering process the dyestuff so obtained dyes cotton and viscose violet tints.

By using as coupling component, instead of 2-(4′-aminophenylamino) - 5 - hydroxynaphthalene - 7:3′ - disulfonic acid, 2-(4′-methyl-phenylamino) - 5 - hydroxynaphthalene-7:3′-disulfonic acid or 2-phenylamino-5-hydroxynaphthalene-7-sulfonic acid-3′-carboxylic acid, there are obtained disazo-dyestuffs which likewise dye cotton and viscose by the single bath or 2-bath after-coppering process red-violet tints.

Example 5

100 parts of cotton are entered at 50° C. into a dyebath which contains in 4000 parts of water 0.5 part of the diasazo-dyestuffs obtained as described in Example 1 and 2 parts of anhydrous sodium carbonate. The temperature of the bath is raised to 90–95° C. in the course of 20 minutes, 40 parts of crystalline sodium carbonate is added, and dyeing is carried on for 30 minutes at 90–100° C. The bath is then allowed to cool to about 70° C., 3 parts of complex sodium copper tartrate of approximately neutral reaction are added, coppering is carried on for ½ hour at about 80° C., and then the dyeing is rinsed in cold water. If desired, the dyeing may be soaped by after-treatment with a solution of 5 parts of soap and 2 parts of anhydrous sodium carbonate in 1000 parts of water. There is obtained a red-violet dyeing of good fastness to washing and light.

What is claimed is:

1. A disazo dyestuff of the formula

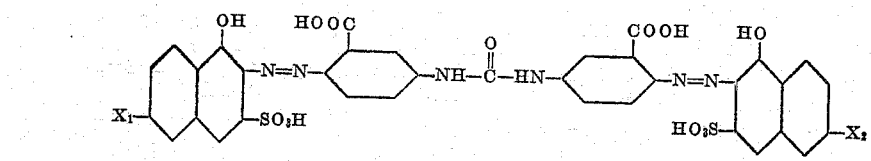

in which $X_1$ and $X_2$ each represent a phenylamino group and at least one of the phenyl radicals of the groups $X_1$ and $X_2$ contains a group imparting solubility in water as a substituent.

2. A disazo dyestuff of the formula

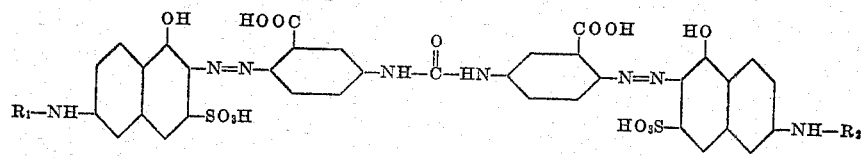

in which $R_1$ and $R_2$ each represent a benzene radical and at least one of the radicals $R_1$ and $R_2$ contains a group imparting solubility in water as a substituent.

3. A disazo dyestuff of the formula

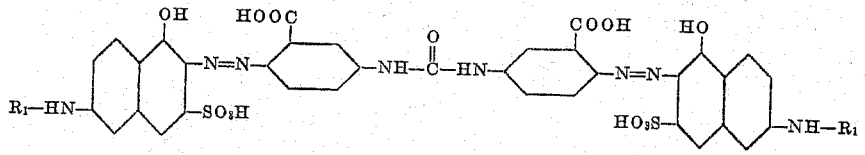

in which $R_1$ represents a benzene radical containing a group imparting solubility in water as a substituent.

4. A disazo dyestuff of the formula

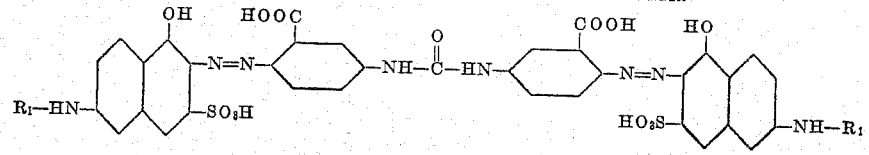

in which $R_1$ represents a benzene radical containing as a substituent a member selected from the group consisting of the substituents of the formulae $-SO_2NH_2$, $-SO_3H$, $-O-CH_2-COOH$ and $-COOH$.

5. The disazo dyestuff of the formula

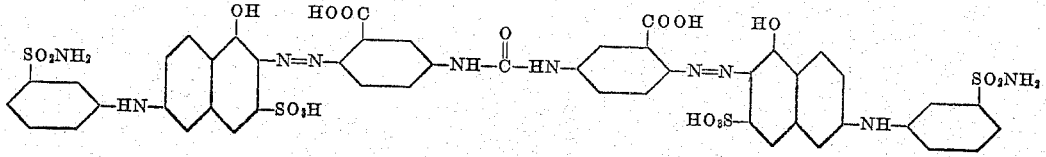

6. The disazo dyestuff of the formula
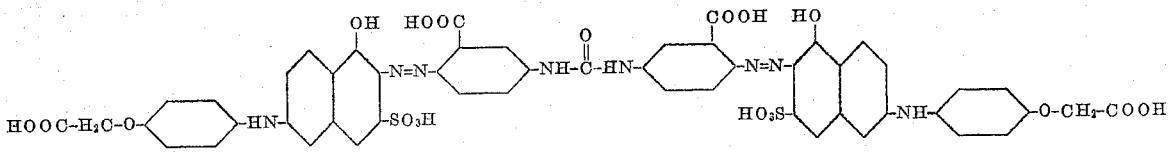
7. The disazo dyestuff of the formula
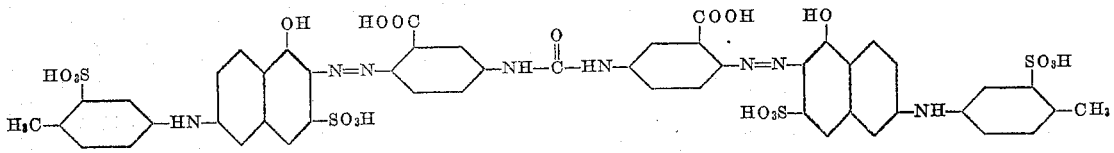
8. The disazo dyestuff of the formula
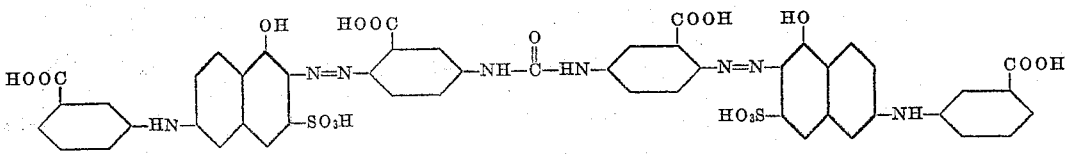
References Cited in the file of this patent
UNITED STATES PATENTS
| | | |
|---|---|---|
| 1,049,109 | Laska | Dec. 31, 1912 |
| 2,120,814 | Rose | June 14, 1938 |
| 2,212,590 | Delfs | Aug. 27, 1940 |

UNITED STATES PATENT OFFICE
CERTIFICATE OF CORRECTION

Patent No. 2,826,574            March 11, 1958

Rudolf von Capeller

It is hereby certified that error appears in the printed specification of the above numbered patent requiring correction and that the said Letters Patent should read as corrected below.

Column 4, between lines 49 and 50, insert the italicized heading --Example 3--; column 5, line 4, for "2-(4′aminophenylamino)-" read -- 2-(4′-aminophenylamino)- --; column 6, line 4, for "diasazo-dyestuffs" read --disazo-dyestuff--.

Signed and sealed this 8th day of July 1958.

(SEAL)
Attest:

KARL H. AXLINE            ROBERT C. WATSON
Attesting Officer           Commissioner of Patents